United States Patent
Kokubo et al.

(10) Patent No.: US 11,498,576 B2
(45) Date of Patent: Nov. 15, 2022

(54) ONBOARD DEVICE, TRAVELING STATE ESTIMATION METHOD, SERVER DEVICE, INFORMATION PROCESSING METHOD, AND TRAVELING STATE ESTIMATION SYSTEM

(71) Applicant: Clarion Co., Ltd., Saitama (JP)

(72) Inventors: Hiroaki Kokubo, Saitama (JP); Norio Watarai, Saitama (JP); Kazunori Nakayama, Saitama (JP)

(73) Assignee: CLARION CO., LTD., Saitama (JP)

( * ) Notice: Subject to any disclaimer, the term of this patent is extended or adjusted under 35 U.S.C. 154(b) by 125 days.

(21) Appl. No.: 16/980,094

(22) PCT Filed: Jan. 31, 2019

(86) PCT No.: PCT/JP2019/003464
§ 371 (c)(1),
(2) Date: Sep. 11, 2020

(87) PCT Pub. No.: WO2019/176356
PCT Pub. Date: Sep. 19, 2019

(65) Prior Publication Data
US 2021/0061290 A1 Mar. 4, 2021

(30) Foreign Application Priority Data
Mar. 14, 2018 (JP) .............................. JP2018-046788

(51) Int. Cl.
*B60W 40/09* (2012.01)
*B60W 50/14* (2020.01)
(Continued)

(52) U.S. Cl.
CPC ............ *B60W 40/09* (2013.01); *B60W 50/14* (2013.01); *G10L 15/063* (2013.01); *G10L 15/10* (2013.01);
(Continued)

(58) Field of Classification Search
CPC .. B60W 40/09; B60W 50/14; B60W 2540/21; B60W 2540/22; B60W 2540/30;
(Continued)

(56) References Cited

U.S. PATENT DOCUMENTS

2008/0105482 A1   5/2008   Yamaguchi et al.
2009/0234552 A1   9/2009   Takeda et al.
(Continued)

FOREIGN PATENT DOCUMENTS

DE   102006049965 A1   10/2007
DE   102014204980 A1   1/2015
(Continued)

OTHER PUBLICATIONS

Japanese Office Action dated Feb. 22, 2022 for Japanese Patent Application No. 2018-046788.
(Continued)

*Primary Examiner* — Nabil H Syed
*Assistant Examiner* — Cal J Eustaquio
(74) *Attorney, Agent, or Firm* — Volpe Koenig

(57) ABSTRACT

An onboard device estimates a traveling state of a vehicle that may be influenced by the psychological state of a driver, based on an utterance of the driver without the use of various sensors, and includes: a voice collection unit for collecting a driver's voice; a traveling state collection unit for collecting traveling state information representing a traveling state of a vehicle; a database generation unit for generating a database by associating voice information corresponding to the collected voice with the collected traveling state information; a learning unit for learning an estimation model, with pairs including the voice information and the traveling state information recorded in the generated database being used as learning data; and an estimation unit for estimating the traveling state of the vehicle that may be influenced by
(Continued)

a psychological state of the driver by using the estimation model, based on an utterance of the driver.

16 Claims, 12 Drawing Sheets

(51) Int. Cl.
  *G10L 15/06* (2013.01)
  *G10L 15/10* (2006.01)
  *G10L 25/63* (2013.01)

(52) U.S. Cl.
  CPC .......... *G10L 25/63* (2013.01); *B60W 2540/21* (2020.02); *B60W 2540/22* (2013.01); *B60W 2540/30* (2013.01); *G10L 2015/0631* (2013.01); *G10L 2015/0638* (2013.01)

(58) Field of Classification Search
  CPC ....... G10L 15/063; G10L 15/10; G10L 25/63; G10L 2015/0631; G10L 2015/0638
  See application file for complete search history.

(56) References Cited

U.S. PATENT DOCUMENTS

| | | |
|---|---|---|
| 2016/0159366 A1 | 6/2016 | Tsuyunashi et al. |
| 2018/0061415 A1 | 3/2018 | Penilla et al. |
| 2019/0185014 A1* | 6/2019 | Choo .................. G06K 9/6293 |

FOREIGN PATENT DOCUMENTS

| | | |
|---|---|---|
| EP | 3498558 A1 | 6/2019 |
| JP | 2000-186942 A | 7/2000 |
| JP | 2006-350567 A | 12/2006 |
| JP | 2007-272834 A | 10/2007 |
| JP | 2009-205645 A | 9/2009 |
| JP | 2010-143362 A | 7/2010 |
| JP | 2010-198120 A | 9/2010 |
| JP | 2016-110449 A | 6/2016 |
| WO | 2018/029789 A1 | 2/2018 |

OTHER PUBLICATIONS

Extended European Search Report dated Feb. 25, 2022 for European Patent Application No. 19767983.0.

* cited by examiner

TRAVELING STATE INFORMATION

Fig.2

| VOICE INFORMATION 1311 | TRAVELING STATE INFORMATION 1312 |
|---|---|
| MFCC, PITCH, POWER, etc. | NUMBER OF TIMES OF SUDDEN ACCELERATION, SUDDEN BRAKING, AND SUDDEN STEERING, FUEL EFFICIENCY, etc. |
| ⋮ | ⋮ |

131

● SUDDEN ACCELERATION "INFREQUENT", SUDDEN BRAKING "INFREQUENT", FUEL EFFICIENCY "GOOD"

△ SUDDEN ACCELERATION "INFREQUENT", SUDDEN BRAKING "FREQUENT", FUEL EFFICIENCY "GOOD"

■ SUDDEN ACCELERATION "FREQUENT", SUDDEN BRAKING "INFREQUENT", FUEL EFFICIENCY "POOR"

ONBOARD DEVICE, TRAVELING STATE ESTIMATION METHOD, SERVER DEVICE, INFORMATION PROCESSING METHOD, AND TRAVELING STATE ESTIMATION SYSTEM

TECHNICAL FIELD

The present invention relates to an onboard device, a traveling state estimation method, a server device, an information processing method, and a traveling state estimation system. The present invention claims priority to Japanese Patent Application No. 2018-046788, filed on Mar. 14, 2018, the contents of which are incorporated by reference herein in designated states where the incorporation of documents by reference is approved.

BACKGROUND ART

In recent years, dangerous driving of automobile drivers (hereinafter referred to as "drivers") has been considered a social issue. Under such circumstances, various support functions for drivers during a driving operation have been proposed.

For example, Patent Literature 1 discloses a technique of estimating the psychological state of a driver based on information related to a driving operation of the driver and thereby issuing an alert to the driver depending on the estimated psychological state.

CITATION LIST

Patent Literature

Patent Literature 1: JP 2010-143362 A

SUMMARY OF INVENTION

Technical Problem

In general, some known examples of information for determining the psychological state of a driver include the driver's operations, frequency of blinking, and heart rate. Detecting these pieces of information, however, necessitates a camera and various sensors such as biological sensors, in which case there are problems in installation costs and creating installation spaces for such devices.

In addition, the method described in Patent Literature 1 requires acquisition of information related to driving operations of the driver. The method thus cannot be applied to a case where a driver is not actively engaged in driving, which will be the case in automated driving expected to gain popularity in the coming years. At present, drivers are not entirely exempt from an obligation to remain vigilant even during automated driving, and accordingly there is a demand for introduction of such a technique that enables estimation of the psychological state of a driver even during automated driving.

The present invention is made in view of such circumstances, and has an object to enable estimation of a traveling state of a vehicle that may be influenced by the psychological state of a driver, based on an utterance of the driver without the use of various sensors.

Solution to Problem

The present application includes a plurality of solutions for solving at least a part of the problems described above.

One example of such a plurality of solutions is as follows. To solve the problems described above, an onboard device according to one aspect of the present invention includes: a voice collection unit configured to collect a voice produced by a driver; a traveling state collection unit configured to collect traveling state information representing a traveling state of a vehicle; a database generation unit configured to generate a database by associating voice information corresponding to the collected voice with the collected traveling state information; a learning unit configured to learn an estimation model, with pairs including the voice information and the traveling state information recorded in the generated database being used as learning data; and an estimation unit configured to estimate the traveling state of the vehicle by using the estimation model, based on an utterance of the driver.

Advantageous Effects of Invention

According to the present invention, a traveling state of a vehicle that may be influenced by the psychological state of a driver can be estimated based on an utterance of the driver without the use of various sensors.

Objects, configurations, and effects other than those described above will be more apparent in description of the following embodiments.

BRIEF DESCRIPTION OF DRAWINGS

FIG. 2 is a diagram illustrating an example of a data structure of a voice and traveling state database.

DESCRIPTION OF EMBODIMENTS

A plurality of embodiments according to the present invention will be described below with reference to the drawings. Note that, in all of the drawings provided for the sake of illustration of each of the embodiments, the same members are denoted by the same reference signs in principle, and repeated description thereof will be omitted.

Further, it goes without saying that, in the following embodiments, described constituent elements (including elementary steps and the like) are not necessarily essential unless otherwise specifically noted or unless the described constituent elements are considered to be obviously essential in principle, for example. Further, it goes without saying that expressions "to consist of A", "to be composed of A", "to have A", and "to include A" do not exclude elements other than A unless it is specifically noted that A is the only element, for example. In a similar manner, in the following embodiments, when the shape, a positional relationship, and the like of constituent elements and the like are described, a shape, a positional relationship, and the like that are substantially close or similar to the described shape, positional relationship, and the like are included unless otherwise specifically noted or unless the described shape, positional relationship, and the like are considered to be obviously essential in principle, for example.

<Correlation Between Voice Produced by Driver and Traveling State of Vehicle>

First of all, a correlation between a voice produced by a driver and a traveling state of a vehicle will be described.

In general, as can be seen in cases where a person speaks faster or louder when they are irritated and speaks flat with less intonation in the volume of their voice when they are sleepy, there is a correlation between the psychological state of a person and their utterances. As can be seen in cases where more sudden acceleration and sudden steering are performed due to aggressiveness when a driver is irritated and more sudden braking is performed due to distraction of attention when a driver is sleepy, the psychological state of a driver may influence driving of the driver, in other words, a traveling state of a vehicle. The present invention is intended for estimation of a traveling state of a vehicle that may be influenced by the psychological state of a driver, based on an utterance of the driver.

<Configuration Example of Onboard Device Being First Embodiment According to Present Invention>

Figure 1:
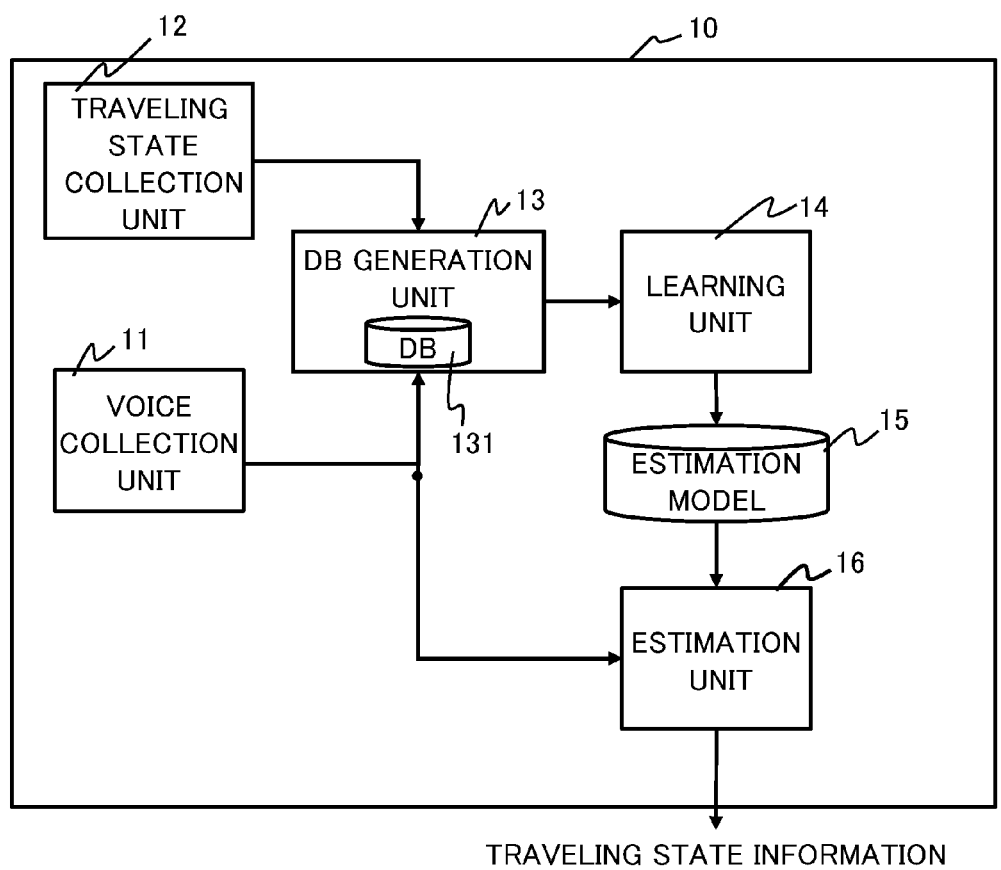
FIG. 1 is a block diagram illustrating a configuration example of an onboard device being a first embodiment according to the present invention.

FIG. 1 illustrates a configuration example of an onboard device being a first embodiment according to the present invention.

An onboard device 10 is configured to collect a voice (utterance) produced by a driver (user), and estimate a driving state of the driver, in other words, a traveling state of a vehicle equipped with the onboard device 10, based on the voice of the driver. The onboard device 10 is, for example, equipped in a vehicle such as an automobile, as a device constituting a navigation system, an onboard computer system, or the like. The estimated traveling state is, for example, used in feedback for calling attention of the driver or the like.

Here, one expected example of the voice produced by the driver is a spoken voice command given by the driver to the navigation system or the onboard computer system. However, the voice of the driver to be collected is not limited to such a voice command. For example, a conversation with another occupant(s) or a soliloquy may be collected.

The onboard device 10 includes a voice collection unit 11, a traveling state collection unit 12, a database (DB) generation unit 13, a learning unit 14, an estimation model 15, and an estimation unit 16.

The voice collection unit 11 collects a voice produced by the driver by using a microphone and an AD converter (neither of which is illustrated), and converts a resultant voice signal into a feature vector (corresponding to voice information according to the present invention). Examples of the feature vector include a mel frequency cepstrum coefficients (MFCC), a pitch, power, and the like. However, the feature vector obtained by converting a voice signal is not limited to the examples described above, and the voice signal may be converted into another feature vector.

The voice collection unit 11 adds collected time of the voice to the feature vector of the voice in estimation model generation processing (described later), and outputs the result to the DB generation unit 13. The voice collection unit 11 outputs the feature vector of the voice to the estimation unit 16 in traveling state estimation processing (described later).

Note that, regarding the microphone and the like used by the voice collection unit 11, dedicated ones may be provided for the onboard device 10, or ones included in the navigation system equipped in the vehicle or the like may be used.

The traveling state collection unit 12 collects traveling state information (number of times of sudden acceleration, sudden braking, and sudden steering, fuel consumption data, or the like) that is used as an index of roughness or danger avoiding actions in driving of the driver by using at least one of an acceleration sensor, a gyro sensor, and a fuel consumption sensor (not illustrated) for detecting a traveling state of the vehicle, based on comparison results between an output value of each sensor and a predetermined threshold, adds collected time to the traveling state information, and outputs the result to the DB generation unit 13. Note that, regarding the acceleration sensor and the like used by the traveling state collection unit 12, dedicated ones may be provided for the onboard device 10, or ones provided in the vehicle in advance may be used.

The DB generation unit 13 generates a voice and traveling state DB 131 by associating the feature vector of the voice that is input from the voice collection unit 11 with the traveling state information that is collected in the traveling state collection unit 12 in a predetermined period of time before and after the collected time of the voice (for example, five minutes before and after the collected time), and recording the associated results.

FIG. 2 illustrates an example of a data structure of the voice and traveling state DB 131.

In each piece of data recorded in the voice and traveling state DB 131, a voice information field 1311 and a traveling state information field 1312 are provided.

In the voice information field 1311, the feature vector of the voice input from the DB generation unit 13 is stored. In this manner, the amount of data to be stored can be reduced, in comparison to a case where the voice signals are directly stored in the voice information field 1311.

In the traveling state information field 1312, as the traveling state information, numerical values representing the number of times of sudden acceleration and the like are recorded. Note that, instead of recording such numerical values, evaluations such as "frequent", "average", "infrequent", "good", and "poor", which are determined by making a comparison between the number of times of sudden acceleration and the like and their respective predetermined thresholds, may be recorded.

FIG. 1 is referred to again. The learning unit 14 generates the estimation model 15 by performing supervised learning, with a pair of the feature vector of the voice and its corresponding traveling state information that are recorded in the voice and traveling state DB 131 being used as learning data, the feature vector of the voice being used as an input vector, and its corresponding traveling state information being used as a training label.

Figure 3:
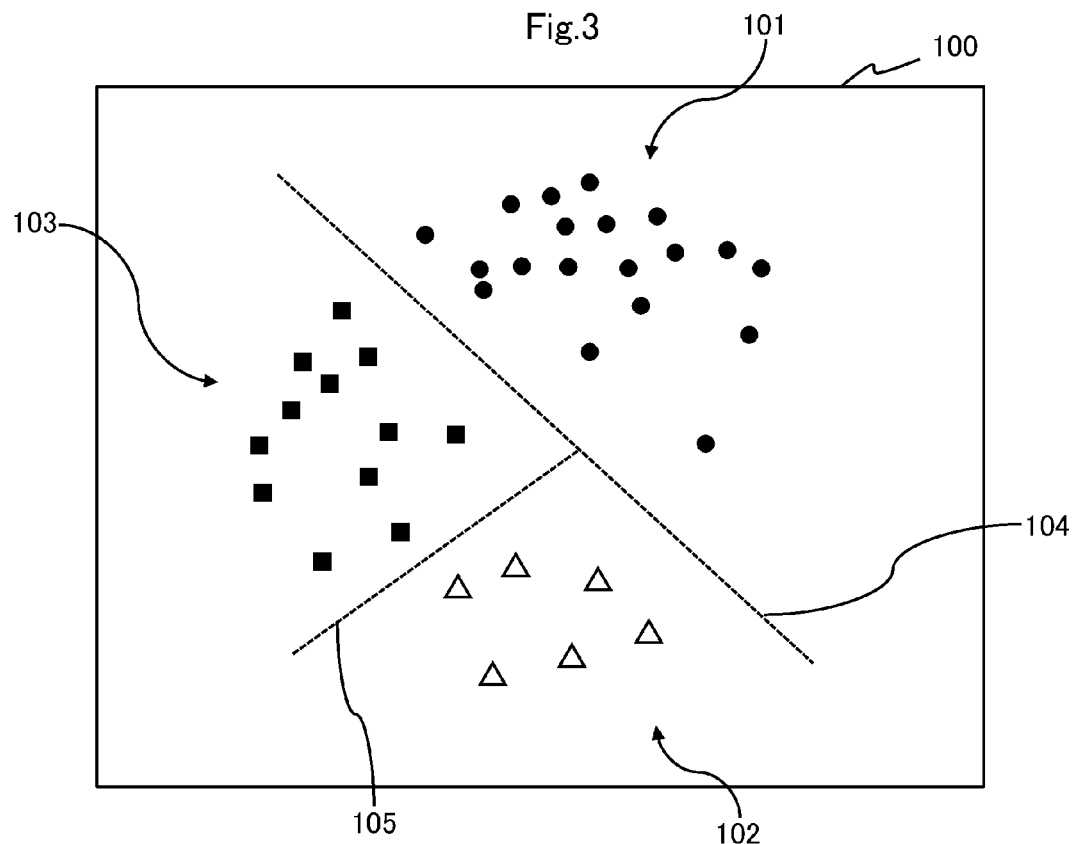
FIG. 3 is a diagram for illustrating supervised learning.

The supervised learning performed by the learning unit 14 will be described with reference to FIG. 3. FIG. 3 is a schematic diagram in which feature vectors of voice signals given training labels of the traveling state information are plotted in an input vector space 100.

The black circles in the diagram represent distribution of feature vectors of voices given a training label of a traveling state with sudden acceleration "infrequent", sudden braking "infrequent", and fuel efficiency "good". The white triangles represent distribution of feature vectors of voices given a training label of a traveling state with sudden acceleration "infrequent", sudden braking "frequent", and fuel efficiency "good". The black squares represent distribution of feature vectors of voices given a training label of a traveling state with sudden acceleration "frequent", sudden braking "infrequent", and fuel efficiency "poor".

In the supervised learning performed by the learning unit 14, the estimation model 15 is generated. In the estimation model 15, planes for identification 104 and 105 define a region 101 in which the black circles are distributed, a region 102 in which the white triangles Δ are distributed, and a region 103 in which the black squares are distributed.

Accordingly, in the estimation model 15, the input vector space 100 is divided by the plane for identification 104 and the like into as many regions as the number of training labels. According to the estimation model 15, by judging to which region of the input vector space 100 the feature vector of the voice belongs, a traveling state at the time when the voice is collected can be estimated.

FIG. 1 is referred to again. The estimation unit 16 estimates a traveling state by using the estimation model 15, and outputs the traveling state information representing estimation results to a subsequent stage.

<Estimation Model Generation Processing Performed by Onboard Device 10>

Figure 4:
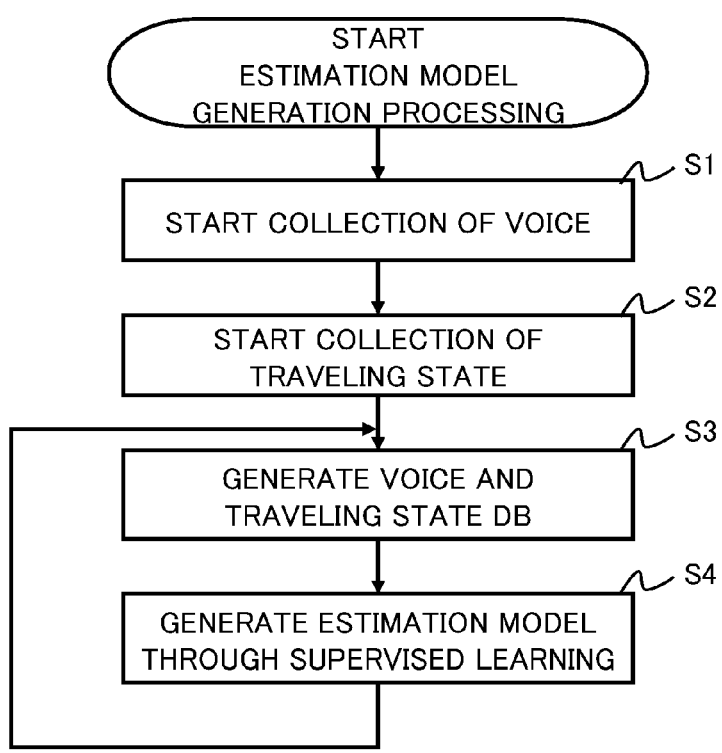
FIG. 4 is a flowchart illustrating an example of estimation model generation processing.

Next, FIG. 4 is a flowchart illustrating an example of estimation model generation processing performed by the onboard device 10.

The estimation model generation processing is started when a vehicle equipped with the onboard device 10 starts traveling, for example.

First, the voice collection unit 11 starts operation of collecting a voice produced by a driver, converting a voice signal corresponding to the voice into a feature vector, and outputting the result to the DB generation unit 13 (Step S1). Meanwhile, the traveling state collection unit 12 starts operation of collecting traveling state information representing a traveling state of a vehicle and outputting the result to the DB generation unit 13 (Step S2). Note that processing of Steps S1 and S2 are started at the same time in actuality.

Next, the DB generation unit 13 generates a voice and traveling state DB 131 by associating the feature vector of the voice that is input from the voice collection unit 11 with the traveling state information that is collected in the traveling state collection unit 12 in a predetermined period of time before and after the collected time of the voice, and recording the associated results (Step S3).

Next, the learning unit 14 generates the estimation model 15 by performing supervised learning through the use of learning data (pairs of the feature vector of the voice and the traveling state information) that is recorded in the voice and traveling state DB 131 (Step S4). Note that the supervised learning performed by the learning unit 14 is executed after a predetermined number of pieces of learning data are accumulated in the voice and traveling state DB 131.

After this, the onboard device 10 causes the processing to return to Step S3, and repeats the subsequent processing. By repeating the processing of Steps S3 and S4, the learning unit 14 can perform supervised learning through the use of a larger number of pieces of learning data. This allows for enhancement of accuracy of the estimation model 15 to be generated.

<Traveling State Estimation Processing Performed by Onboard Device 10>

Figure 5:
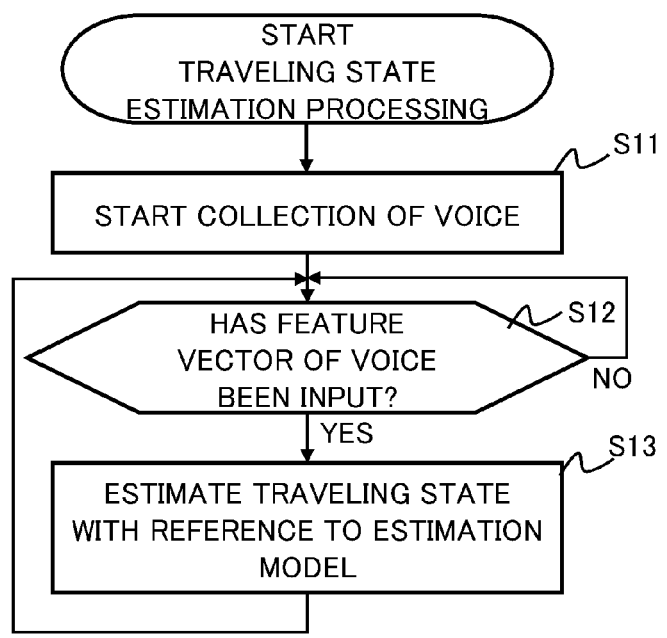
FIG. 5 is a flowchart illustrating an example of traveling state estimation processing.

Next, FIG. 5 is a flowchart illustrating an example of traveling state estimation processing performed by the onboard device 10.

The traveling state estimation processing is started when a vehicle equipped with the onboard device 10 starts traveling, for example, on the assumption that the estimation model 15 has already been generated through the estimation model generation processing described above.

First, the voice collection unit 11 starts processing of collecting a voice produced by a driver, converting a voice signal corresponding to the voice into a feature vector, and outputting the result to the estimation unit 16 (Step S11). Next, the estimation unit 16 monitors input from the voice collection unit 11, and determines whether or not the estimation unit 16 has received input of the feature vector of the voice (Step S12). When the estimation unit 16 determines that the estimation unit 16 has not received input of the feature vector of the voice (NO in Step S12), the estimation unit 16 continues to monitor input from the voice collection unit 11.

In contrast, when the estimation unit 16 determines that the estimation unit 16 has received input of the feature vector of the voice (YES in Step S12), the estimation unit 16 estimates a traveling state of a vehicle by using the estimation model 15, based on a region of the input vector space 100 to which the feature vector of the voice input from the voice collection unit 11 belongs, and outputs traveling state information representing estimation results to a subsequent stage. After this, the onboard device 10 causes the processing to return to Step S12, and repeats the subsequent processing.

According to the traveling state estimation processing described above, a traveling state of a vehicle that may be influenced by the psychological state of a driver can be estimated based on an utterance of the driver without the use of sensors that detect the driver's operations, frequency of blinking, and heart rate, for example.

Note that, although the traveling state information output from the onboard device 10 may be used for any purpose, some examples thereof will be described in modifications to be described later.

<Configuration Example of Traveling State Estimation System Being Second Embodiment According to Present Invention>

Figure 6:
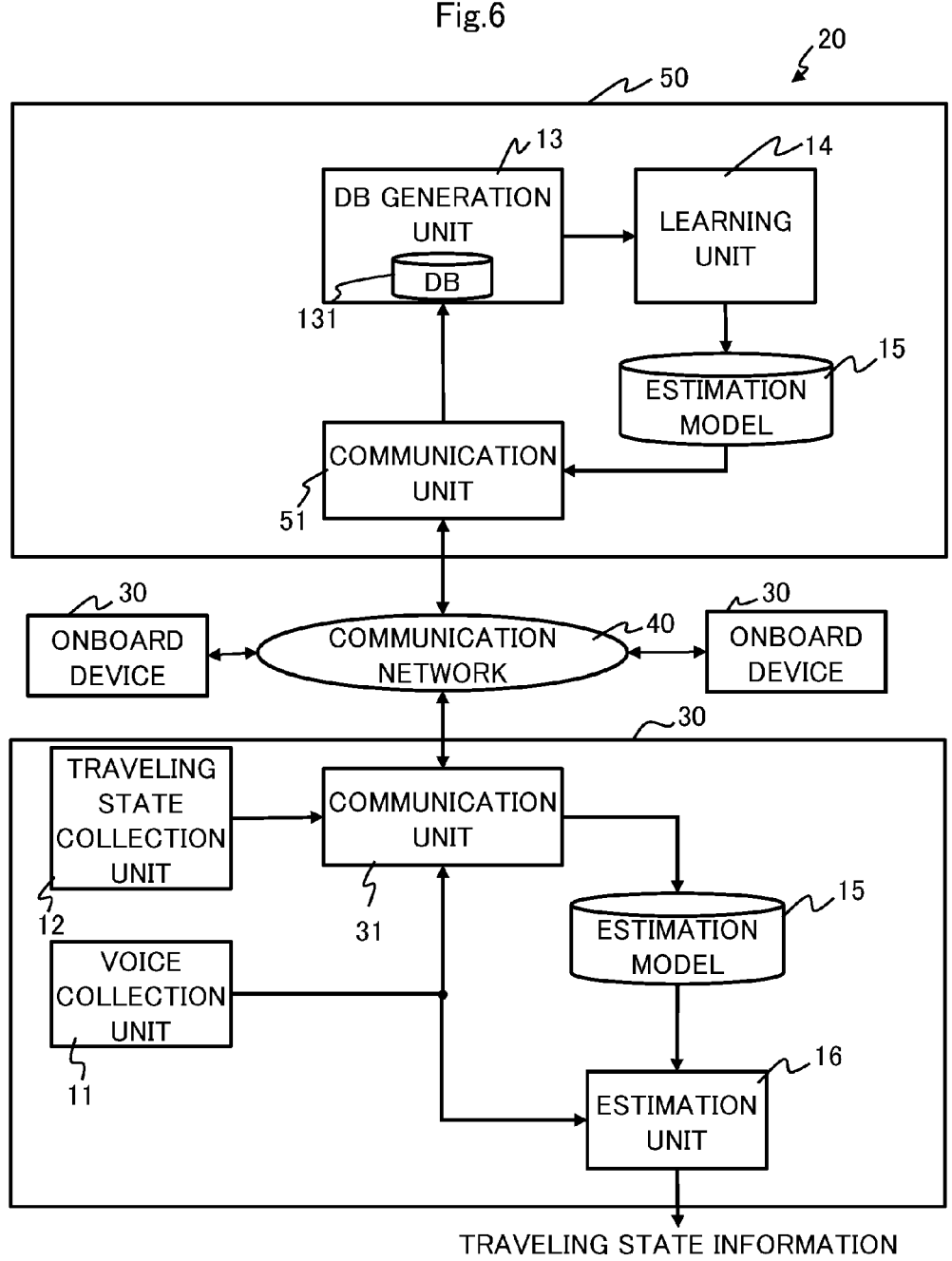
FIG. 6 is a block diagram illustrating a configuration example of a traveling state estimation system being a second embodiment according to the present invention.

Next, FIG. 6 illustrates a configuration example of a traveling state estimation system being a second embodiment according to the present invention.

A traveling state estimation system 20 includes a plurality of onboard devices 30 and a server device 50 that are connected via a communication network 40. The communication network 40 is, for example, a mobile phone communication network, the Internet, or the like.

In each of the onboard devices 30 and the server device 50, constituent elements of the onboard device 10 (FIG. 1) are arranged in a distributed manner. Some of the constituent elements of each of the onboard devices 30 and the server device 50 that are common to the constituent elements of the onboard device 10 are denoted by the same reference signs, and description thereof will be omitted as appropriate.

Each onboard device 30 has the following configuration: in comparison to the onboard device 10, the DB generation unit 13 and the learning unit 14 are omitted, and a communication unit 31 is added. Note that the DB generation unit 13 and the learning unit 14 omitted from the onboard device 30 are provided in the server device 50.

Specifically, each onboard device 30 includes a voice collection unit 11, a traveling state collection unit 12, an estimation model 15, an estimation unit 16, and a communication unit 31.

The voice collection unit 11 of the onboard device 30 adds collected time of a voice to a feature vector of the voice and outputs the result to the communication unit 31 in the estimation model generation processing, and outputs the feature vector of the voice to the estimation unit 16 in the traveling state estimation processing.

The traveling state collection unit 12 of the onboard device 30 adds the collected time to collected traveling state information, and outputs the result to the communication unit 31.

The communication unit 31 (corresponding to a first communication unit according to the present invention) associates the feature vector of the voice input from the voice collection unit 11 and the traveling state information collected in the traveling state collection unit 12 within a predetermined period of time with respect to the collected time of the voice with each other, and transmits the associated results to the server device 50 via the communication network 40, in the estimation model generation processing. In addition, the communication unit 31 receives the estimation model 15 that is generated in the server device 50, and updates the estimation model 15 that exists in the onboard device 30.

The server device 50 includes a DB generation unit 13, a learning unit 14, an estimation model 15, and a communication unit 51.

The DB generation unit 13 of the server device 50 generates the voice and traveling state DB 131 by associating the feature vector of the voice that is input from each onboard device 30 via the communication network 40 with a corresponding traveling state information that is collected in the traveling state collection unit 12 of each onboard device 30 in a predetermined period of time before and after the collected time of the voice and recording the associated results.

The learning unit 14 of the server device 50 generates the estimation model 15 by performing supervised learning through the use of the voice and traveling state DB 131, and transmits the generated estimation model 15 to each onboard device 30 via the communication network 40.

The communication unit 51 (corresponding to a second communication unit according to the present invention) receives the feature vector of the voice transmitted from each onboard device 30 via the communication network 40, and outputs the received feature vectors to the DB generation unit 13. The communication unit 51 receives the traveling state information transmitted from each onboard device 30 via the communication network 40, and outputs the received traveling state information to the DB generation unit 13. In addition, the communication unit 51 transmits the estimation model 15 generated in the learning unit 14 to each onboard device 30 via the communication network 40.

In the traveling state estimation system 20, the estimation model generation processing is mainly executed in the server device 50, and the traveling state estimation processing is executed in each onboard device 30. The server device 50 that mainly executes the estimation model generation processing has connection to a plurality of onboard devices 30, thus allowing a larger number of pieces of learning data than that in the first embodiment to be more easily recorded in the voice and traveling state DB 131 generated in the DB generation unit 13 of the server device 50. This allows for further enhancement of accuracy of the estimation model 15 to be generated in the learning unit 14, in comparison to the first embodiment. Therefore, in the traveling state estimation system 20, accuracy of estimating a traveling state of a vehicle that may be influenced by the psychological state of a driver can be expected to be enhanced, in comparison to the onboard device 10.

<Configuration Example of Traveling State Estimation System Being Third Embodiment According to Present Invention>

Figure 7:
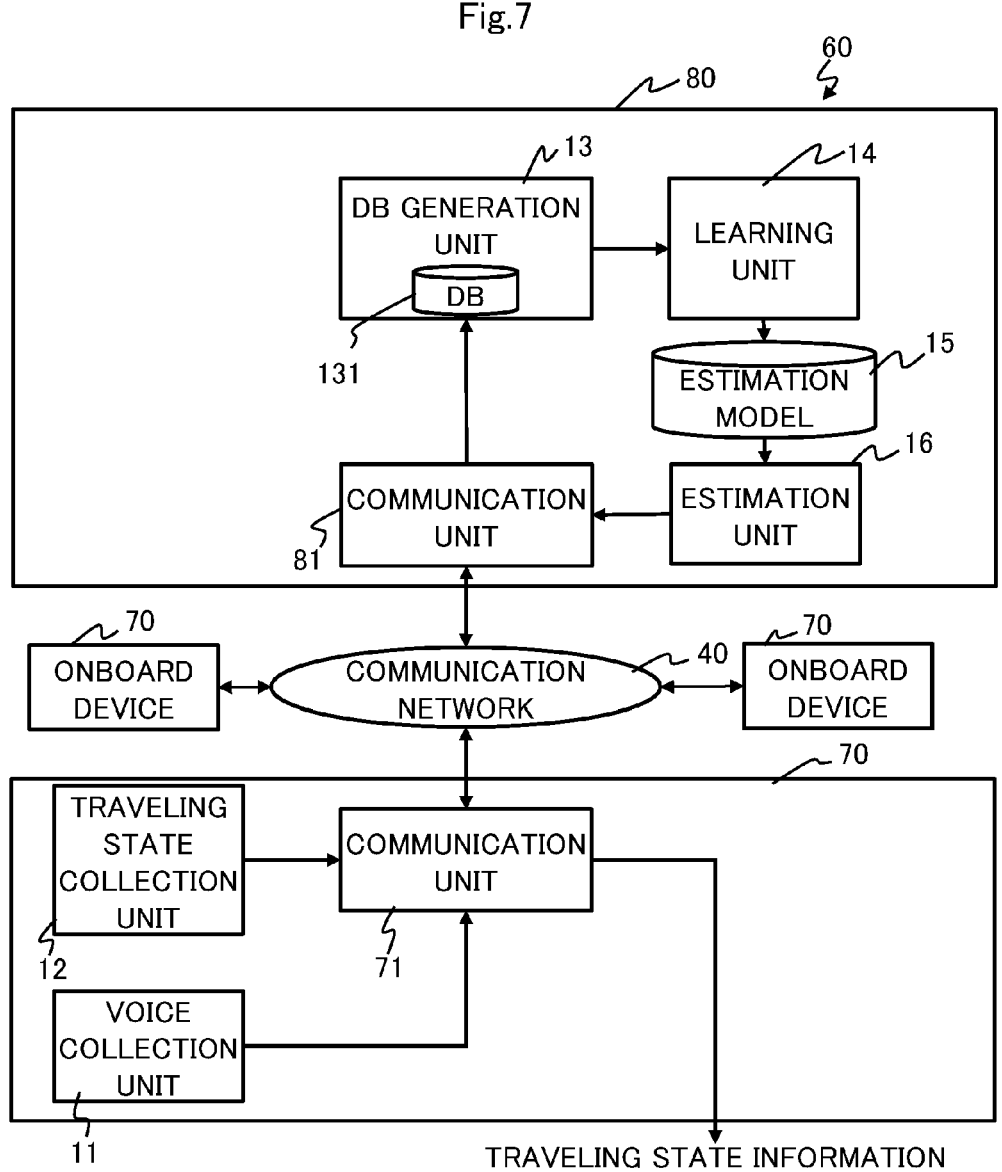
FIG. 7 is a block diagram illustrating a configuration example of a traveling state estimation system being a third embodiment according to the present invention.

Next, FIG. 7 illustrates a configuration example of a traveling state estimation system being a third embodiment according to the present invention.

A traveling state estimation system 60 includes a plurality of onboard devices 70 and a server device 80 that are connected via a communication network 40.

In each of the onboard devices 70 and the server device 80, constituent elements of the onboard device 10 are disposed in a distributed manner. Some of the constituent elements of each of the onboard devices 70 and the server device 80 that are common to the constituent elements of the onboard device 10 are denoted by the same reference signs, and description thereof will be omitted as appropriate.

Each onboard device 70 has the following configuration: in comparison to the onboard device 10, the DB generation unit 13, the learning unit 14, the estimation model 15, and the estimation unit 16 are omitted, and a communication unit 71 is added. Note that the DB generation unit 13, the learning unit 14, the estimation model 15, and the estimation unit 16 omitted from the onboard device 70 are provided in the server device 80.

Specifically, each onboard device 70 includes a voice collection unit 11, a traveling state collection unit 12, and a communication unit 71.

The voice collection unit 11 of the onboard device 70 adds collected time of the voice to the feature vector of the voice and outputs the result to the communication unit 71 in the estimation model generation processing, and outputs the feature vector of the voice to the communication unit 71 in the traveling state estimation processing.

The traveling state collection unit 12 of the onboard device 70 adds the collected time to collected traveling state information, and outputs the result to the communication unit 71.

The communication unit 71 transmits the feature vector of the voice output by the voice collection unit 11 and the traveling state information output by the traveling state collection unit 12 to the server device 80 via the communication network 40, in the estimation model generation processing. In addition, the communication unit 71 transmits the feature vector of the voice output by the voice collection unit 11 to the server device 80 via the communication network 40 and receives the estimated traveling state information transmitted from the server device 80, in the traveling state estimation processing.

The server device 80 includes a DB generation unit 13, a learning unit 14, an estimation model 15, an estimation unit 16, and a communication unit 81.

The communication unit 81 receives the feature vector of the voice transmitted from each onboard device 70 via the communication network 40 and outputs the received feature vectors to the DB generation unit 13, in the estimation model generation processing. The communication unit 81 receives the traveling state information transmitted from each onboard device 70 via the communication network 40, and outputs the received traveling state information to the DB generation unit 13, in the estimation model generation processing. In addition, the communication unit 81 outputs the feature vector of the voice transmitted from each onboard device 70 via the communication network 40 to the estimation unit 16, and transmits the traveling state information representing estimation results produced in the estimation unit 16 based on the feature vector to each onboard device 70 via the communication network 40, in the estimation model generation processing.

In the traveling state estimation system 60, the estimation model generation processing and the traveling state estimation processing are mainly executed in the server device 80. The server device 80 that mainly executes the estimation model generation processing has connection to a plurality of onboard devices 70, thus allowing a larger number of pieces of learning data than that in the first embodiment to be more easily recorded in the voice and traveling state DB 131 generated in the DB generation unit 13 of the server device 80. This allows for further enhancement of accuracy of the estimation model 15 to be generated in the learning unit 14, in comparison to the first embodiment. Therefore, in the traveling state estimation system 60, accuracy of estimating a traveling state of a vehicle that may be influenced by the psychological state of a driver can be expected to be enhanced, in comparison to the onboard device 10. A processing load of the onboard device 70 in the estimation model generation processing and the traveling state estimation processing can be reduced in comparison to the onboard device 10.

<First Modification of Onboard Device Being First Embodiment According to Present Invention>

Figure 8:
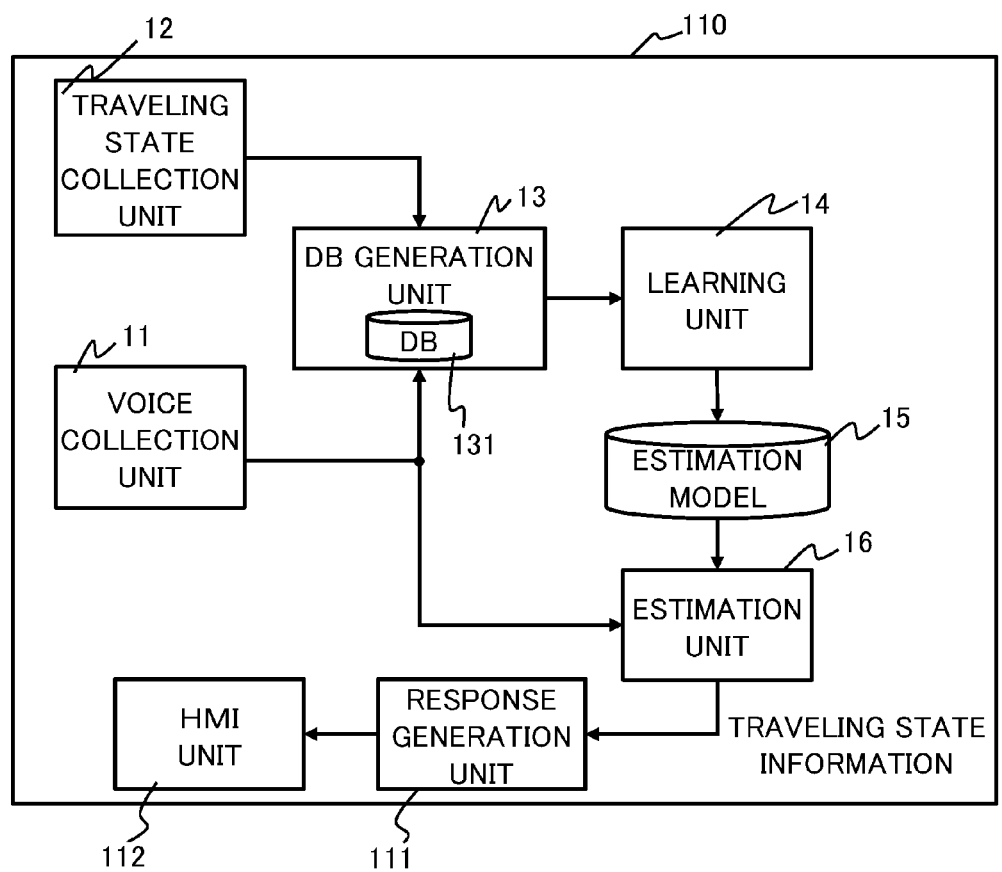
FIG. 8 is a block diagram illustrating a first modification of the onboard device being the first embodiment according to the present invention.

Next, FIG. 8 illustrates a first modification of the onboard device being the first embodiment according to the present invention.

An onboard device 110 has the following configuration: in comparison to the onboard device 10 (FIG. 1), a response generation unit 111 and a human machine interface (HMI) unit 112 are added. Some of the constituent elements of the onboard device 110 that are common to the constituent elements of the onboard device 10 are denoted by the same reference signs, and description thereof will be omitted as appropriate.

With the traveling state information output by the estimation unit 16 being used as input, the response generation unit 111 (corresponding to a feedback generation unit according to the present invention) generates a response (feedback for the driver) according to an estimated traveling state, and outputs the generated response to the HMI unit 112. The HMI unit 112 presents the response generated by the response generation unit 111 to the driver in the form of a voice message or a screen display, for example, by using a speaker or a display (neither of which is illustrated) or the like, for example. Note that, regarding the speaker and the like used by the HMI unit 112, dedicated ones may be provided for the onboard device 110, or ones provided in the vehicle may be used.

Examples of the response according to a traveling state of a vehicle that may be influenced by the psychological state of the driver are as follows: when it is estimated that the traveling state is a state with "frequent sudden braking", the psychological state of the driver is likely to be a state that an awakening level is low or attention is distracted, and thus a message for prompting calling attention, such as "Focus on driving.", or a message for suggesting having a rest, such as "It's about time to have a rest.", is output to the driver through a speaker in a voice format or is displayed for the driver on a display in a text format.

Other examples are as follows: when it is estimated that the traveling state is a state with "frequent sudden acceleration and poor fuel efficiency", the psychological state of the driver is likely to be a state that the driver is in a rush or nervous, and thus a message for prompting calling attention, such as "Relax.", is output to the driver in a voice format or in a text format, or a musical piece for soothing the driver, such as a piece of classical music or a slow ballad, is played to be output.

According to the onboard device 110 described above, a traveling state that may be influenced by the psychological state of a driver can be estimated based on an utterance of the driver without the use of various sensors, and in addition, the driver can be appropriately supported through feedback (response) according to an estimated traveling state.

<Second Modification of Onboard Device Being First Embodiment According to Present Invention>

Figure 9:
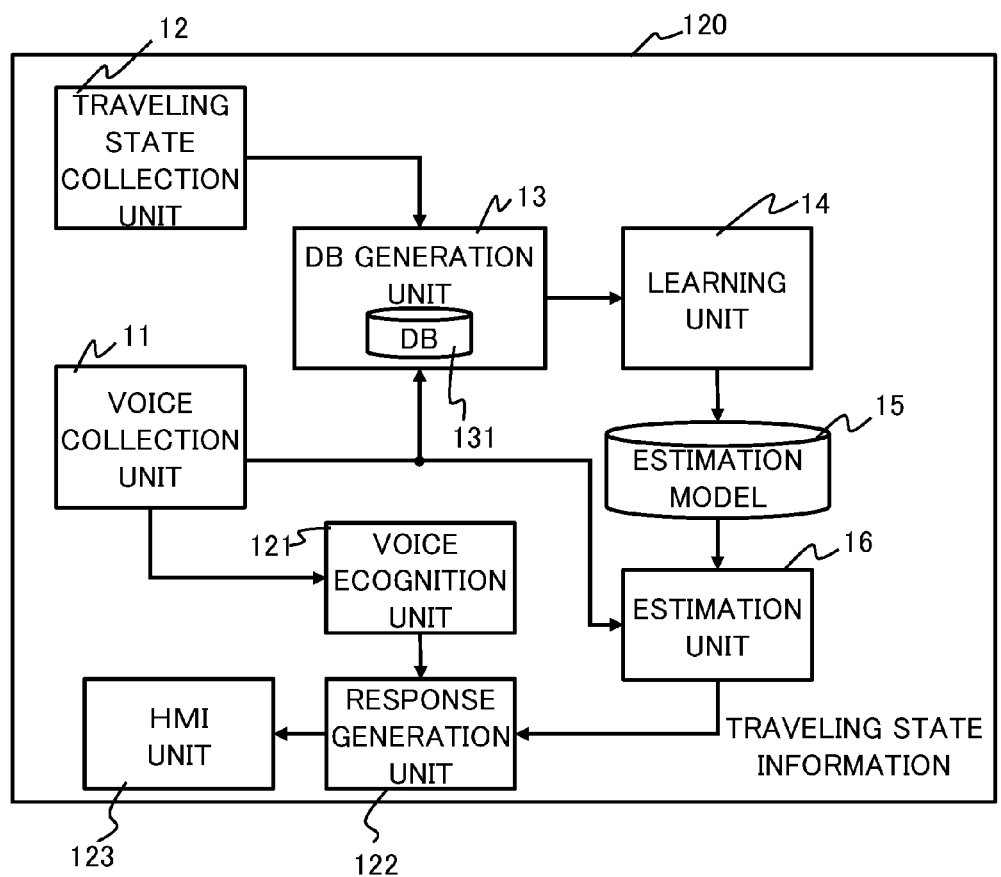
FIG. 9 is a block diagram illustrating a second modification of the onboard device being the first embodiment according to the present invention.

Next, FIG. 9 illustrates a second modification of the onboard device being the first embodiment according to the present invention.

An onboard device 120 has the following configuration: in comparison to the onboard device 10 (FIG. 1), a voice recognition unit 121, a response generation unit 122, and an HMI unit 123 are added. Some of the constituent elements of the onboard device 120 that are common to the constituent elements of the onboard device 10 are denoted by the same reference signs, and description thereof will be omitted as appropriate.

Note that the voice collection unit 11 of the onboard device 120 outputs the feature vector of a collected voice to the estimation unit 16, and also outputs the voice signal of the collected voice to the voice recognition unit 121, in the traveling state estimation processing.

The voice recognition unit 121 performs voice recognition processing on the voice signal of the driver input from the voice collection unit 11, and outputs voice recognition results to the response generation unit 122. Note that a microphone may be connected to the voice recognition unit 121, so that the voice recognition unit 121 receives input of the voice signal of the driver without using the voice collection unit 11.

With the traveling state information output by the estimation unit 16 and the voice recognition results (contents of an utterance) produced by the voice recognition unit 121 being used as input, the response generation unit 122 generates a response according to a traveling state of a vehicle that may be influenced by the psychological state of the driver and contents of an utterance, and outputs the generated response to the HMI unit 123. The HMI unit 123 presents the response generated by the response generation unit 122 to the driver in the form of a voice message or a screen display, for example, by using a speaker or a display (neither of which is illustrated) or the like, for example. Note that, regarding the speaker and the like used by the HMI unit 123, dedicated ones may be provided for the onboard device 120, or ones provided in the vehicle may be used.

Examples of the response according to a traveling state and an utterance are as follows: when contents of the utterance of the driver are "Play some music." and it is estimated that the traveling state is a state with "frequent sudden acceleration and poor fuel efficiency", it can be estimated that the psychological state of the driver is likely to be a state that the driver is in a rush or nervous, and thus a musical piece such as a piece of classical music or a slow ballad is selected and is played to be output to soothe the driver. When it is estimated that the traveling state is a state with "frequent sudden braking", by contrast, it can be estimated that the psychological state of the driver is likely to be a state that an awakening level is low (state that the driver feels drowsiness), and thus such an up-tempo musical piece that awakes the driver is selected and is played to be output.

Other examples are as follows: when contents of the utterance of the driver are "Search for a restaurant." and it is estimated that the traveling state is a state with "no sudden acceleration or sudden braking (normal state)", it can be estimated that the psychological state of the driver is stable and the driver has some time to spare, and thus restaurants that suit the driver's taste that is set in advance are searched, and search results are output. When it is estimated that the traveling state is a state with "frequent sudden acceleration and poor fuel efficiency", by contrast, it can be estimated that the psychological state of the driver is a state that the driver is in a rush and does not have time to spare, and thus restaurants at which the driver can arrive as early as possible are preferentially searched over restaurants that suit the driver's taste, and search results are output.

According to the onboard device 120 described above, a traveling state that may be influenced by the psychological state of a driver can be estimated based on an utterance of the driver without the use of various sensors.

According to the onboard device 120, when a voice command from a driver is judged to execute processing, an estimated traveling state is used as well as voice recognition results. As a result, the driver can be appropriately supported through feedback (response) taking into consideration of a verbally unexpressed psychological state not exhibited in the voice recognition results.

<Third Modification of Onboard Device Being First Embodiment According to Present Invention>

Figure 10:
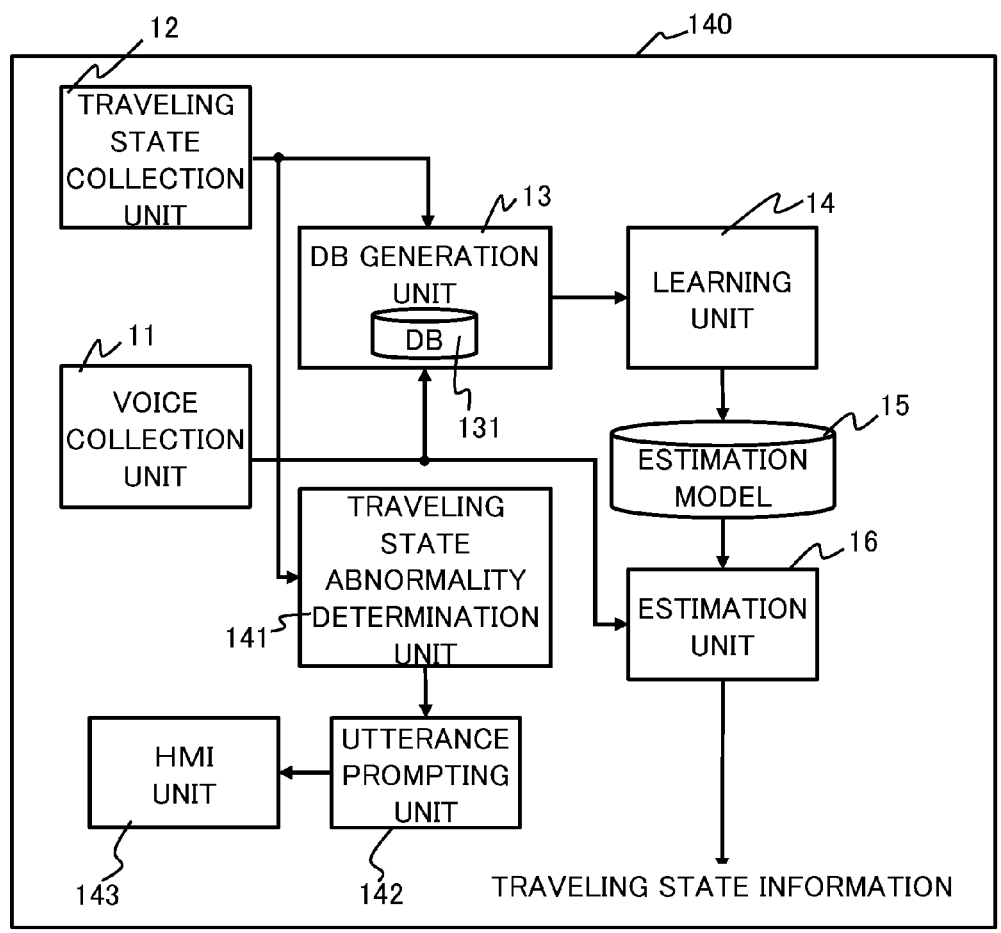
FIG. 10 is a block diagram illustrating a third modification of the onboard device being the first embodiment according to the present invention.

Next, FIG. 10 illustrates a third modification of the onboard device being the first embodiment according to the present invention.

An onboard device 140 has the following configuration: in comparison to the onboard device 10 (FIG. 1), a traveling state abnormality determination unit 141, an utterance prompting unit 142, and an HMI unit 143 are added. Some of the constituent elements of the onboard device 140 that are common to the constituent elements of the onboard device 10 are denoted by the same reference signs, and description thereof will be omitted as appropriate.

Note that the traveling state collection unit 12 of the onboard device 140 adds collected time to collected traveling state information and outputs the result to the DB generation unit 13, and also outputs the collected traveling state information to the traveling state abnormality determination unit 141.

The traveling state abnormality determination unit 141 detects an abnormal traveling state that deviates from a normal traveling state, based on the traveling state information input from the traveling state collection unit 12.

Figure 11:
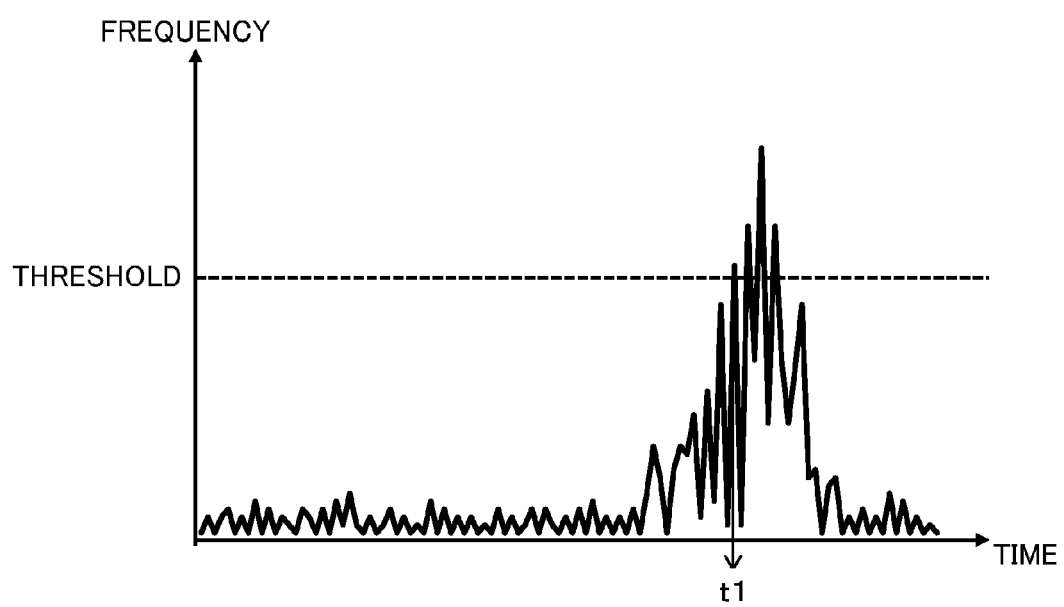
FIG. 11 is a diagram for illustrating a method for determining abnormality of a traveling state.

FIG. 11 illustrates variation of frequency of abnormal driving (sudden acceleration, sudden braking, sudden steering, and the like) in time series, which is used by the traveling state abnormality determination unit 141 to detect and determine an abnormal traveling state. In FIG. 11, the horizontal axis represents time and the vertical axis represents frequency.

The traveling state abnormality determination unit 141 counts frequency of abnormal driving, based on the traveling state information input from the traveling state collection unit 12. When the count value exceeds a predetermined threshold (timing t1 of FIG. 11), the traveling state abnormality determination unit 141 determines that a traveling state is an abnormal traveling state, and reports results indicating such determination of an abnormal traveling state to the utterance prompting unit 142.

In response to receiving such a report indicating determination of an abnormal traveling state from the traveling state abnormality determination unit 141, the utterance prompting unit 142 generates a question message that prompts the driver to produce an utterance, which is, for example, a question of such as "Would you like to have a rest?", "It's about lunch time. Restaurants will be searched. Tell me what you would like to eat.", or "Let's listen to some music. Tell me which album of an artist to play.", and outputs the generated question message to the HMI unit 143. Note that, regarding the question message, a message may be selected out of messages that are prepared in advance, depending on a traveling state, time, or the like.

The HMI unit 143 presents the question generated by the utterance prompting unit 142 to the driver in the form of a voice message or a screen display, for example, by using a speaker or a display (neither of which is illustrated) or the like, for example. Note that, regarding the speaker and the like used by the HMI unit 143, dedicated ones may be provided for the onboard device 140, or ones provided in the vehicle may be used.

According to the onboard device 140 described above, a driver is prompted to produce an utterance when it is determined that a traveling state is an abnormal traveling state. As a result, utterances of the driver can be actively collected, and pieces of learning data for supervised learning can thus be efficiently collected. This allows for enhancement of accuracy of estimating a traveling state through enhancement of accuracy of the estimation model 15 to be generated.

Note that the first to third modifications described above can be combined as appropriate. Specifically, for example, the traveling state abnormality determination unit 141 and the utterance prompting unit 142 according to the third modification may be added to the first modification and the second modification.

The second and third embodiments according to the present invention described above can be modified similarly to the first to third modifications described above.

Incidentally, the onboard devices 10, 30, 70, 110, 120, 130, and 140 and the server devices 50 and 80 described above can be configured with hardware, or can be implemented with software. When the onboard device 10 and the like are implemented with software, programs for configuring the software are installed in a computer. Examples of such a computer herein include a computer incorporated in dedicated hardware, a computer such as a general-purpose personal computer that can execute various functions by installing various programs, etc.

Figure 12:
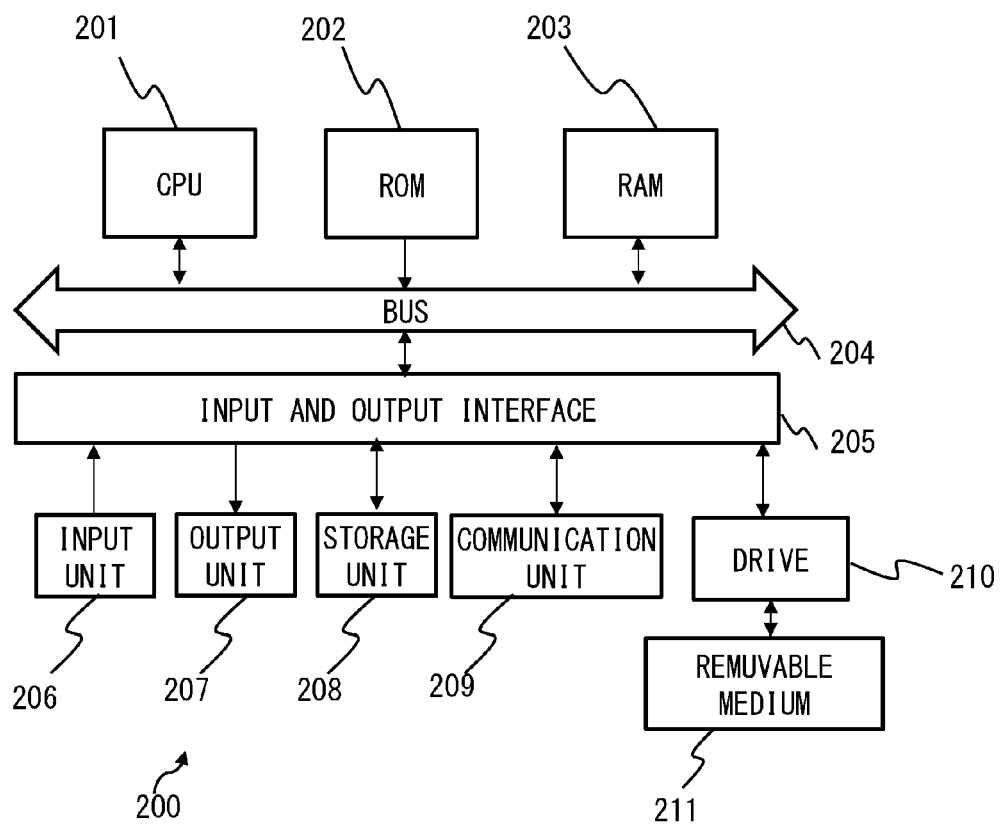
FIG. 12 is a block diagram illustrating a configuration example of a computer.

FIG. 12 is a block diagram illustrating a configuration example of hardware of a computer that implements the onboard device 10 and the like by using a program.

In a computer 200, a central processing unit (CPU) 201, a read only memory (ROM) 202, and a random access memory (RAM) 203 are connected to one another by a bus 204.

To the bus 204, an input and output interface 205 is further connected. To the input and output interface 205, an input unit 206, an output unit 207, a storage unit 208, a communication unit 209, and a drive 210 are connected. To the input and output interface 205, a microphone, an AD converter, an acceleration sensor, a gyro sensor, a fuel consumption sensor, and the like (none of which is illustrated) may be connected.

In addition, to the input and output interface 205, a positioning signal reception unit such as a GPS receiver, a connector such as an OBD port for establishing connection to an in-vehicle network of an automobile, an FM multiplex broadcasting reception unit, and the like may be connected.

The input unit 206 includes a keyboard, a mouse, a microphone, or the like. The output unit 207 includes a display, a speaker, or the like. The storage unit 208 includes a hard disk, a solid state drive (SSD), or the like. The communication unit 209 is a communication telephone module, a Wi-Fi communication module, or the like. The drive 210 drives a removable medium 211 such as a magnetic disk, an optical disc, a magneto-optical disk, or a semiconductor memory.

In the computer 200 configured as described above, for example, the onboard device 10 and the like are implemented when the CPU 201 loads a program that is stored in the storage unit 208 onto the RAM 203 via the input and output interface 205 and the bus 204 and then executes the loaded program.

For example, the program to be executed by the computer 200 (CPU 201) can be provided in the form of being recorded in the removable medium 211 that serves as a package medium or the like. The program can be provided via a wired or wireless transmission medium, such as a local area network, a communication network, or digital satellite broadcasting.

In the computer 200, the program can be installed in the storage unit 208 via the input and output interface 205 by loading the removable medium 211 into the drive 210. The program can be received in the communication unit 209 via a wired or wireless transmission medium, and installed in the storage unit 208. In addition, the program can be installed in the ROM 202 or the storage unit 208 in advance.

Note that the program to be executed by the computer 200 may be such a program that processing is performed in time series in the order described in this specification, or may be such a program that processing is performed either in parallel or at necessary timing when the processing is called, for example.

The effects described in this specification are merely illustrative and not restrictive, and other effects may be exerted.

The present invention is not limited to the embodiments described above, and includes various modifications. For example, each of the embodiments described above is described in detail for the sake of better understanding of the present invention, and the present invention is not necessarily limited to an embodiment including all of the constituent elements described above. A part of a configuration of one embodiment can be replaced by a configuration of another embodiment. A configuration of one embodiment can be added to a configuration of another embodiment. A part of a configuration of each of the embodiments can be added to, deleted from, or replaced by another configuration.

A part or the whole of each of the configurations, functions, processing units, processing means, or the like described above may be implemented with hardware by, for example, configuring it with an integrated circuit, for example. Each of the configurations, functions, or the like described above may be implemented with software by a processor interpreting a program for implementing a corresponding function and then executing the program. Information of a program, a table, a file, or the like for implementing each of the functions can be stored in a storage device such as a memory, a hard disk, and an SSD, or a recording medium such as an IC card, an SD card, and a DVD. Illustrated control lines and information lines are those considered to be required for the sake of description. The illustrated control lines and information lines may not necessarily cover all the control lines and information lines required in a product. It may be assumed that most of all the configurations are connected to one another in actuality.

The present invention can be provided not only in the aspects of an onboard device, a traveling state estimation method, a server device, and a traveling state estimation system, but can also be provided in various aspects, such as an aspect of a computer-readable program.

REFERENCE SIGNS LIST

10: Onboard device, 11: Voice collection unit, 12: Traveling state collection unit, 13: DB generation unit, 14: Learning unit, 15: Estimation model, 16: Estimation unit, 20: Traveling state estimation system, 21: Communication unit, 30: Onboard device, 31: Communication unit, 40: Communication network, 50: Server device, 51: Communication unit, 60: Traveling state estimation system, 70: Onboard device, 71: Communication unit, 80: Server device, 81: Communication unit, 100: Input vector space, 101: Region, 102: Region, 103: Region, 104: Plane for identification, 105: Plane for identification, 110: Onboard device, 111: Response generation unit, 112: HMI unit, 120: Onboard device, 121: Voice recognition unit, 122: Response generation unit, 123: HMI unit, 130: Onboard device, 140: Onboard device, 141: Traveling state abnormality determination unit, 142: Utterance prompting unit, 143: HMI unit, 200: Computer, 201: CPU, 202: ROM, 203: RAM, 204: Bus, 205: Input and output interface, 206: Input unit, 207: Output unit, 208: Storage unit, 209: Communication unit, 210: Drive, 211: Removable medium.

What is claimed is:

1. An onboard device comprising:
a memory; and
a processor coupled to the memory and configured to:
collect a voice produced by a driver;
collect traveling state information representing a traveling state of a vehicle;
generate a database by associating voice information corresponding to the collected voice with the collected traveling state information;
learn an estimation model, with pairs including the voice information and the traveling state information recorded in the generated database being used as learning data;
generate the estimation model through supervised learning, with the voice information of the learning data being used as an input vector and the traveling state information of the learning data being used as a training label; and
estimate the traveling state of the vehicle that may be influenced by a psychological state of the driver by using the estimation model, based on an utterance of the driver.

2. The onboard device according to claim 1, wherein
the processor is configured to generate the database by associating the voice information corresponding to the collected voice with the traveling state information collected before and after collected time of the voice.

3. The onboard device according to claim 1, wherein
the processor is configured to: convert the voice produced by the driver into a feature vector, and
generate the database by associating the feature vector being the voice information corresponding to the collected voice and the collected traveling state information with each other.

4. The onboard device according to claim 1, wherein
the processor is configured to collect the traveling state information, based on an output value of at least one of an acceleration sensor, a gyro sensor, and a fuel consumption sensor.

5. The onboard device according to claim 1,
wherein the processor is a configured to generate feedback for the driver according to the estimated traveling state.

6. The onboard device according to claim 5, wherein the processor is
configured to recognize the collected voice of the driver, and
the processor generates the feedback for the driver according to voice recognition results of the voice of the driver and the estimated traveling state.

7. The onboard device according to claim 1,
wherein the processor is configured to prompt the driver to produce an utterance.

8. The onboard device according to claim 7,
wherein the processor is configured to determine whether or not the traveling state is an abnormal traveling state, and
the processor prompts the driver to produce an utterance when it is determined that the traveling state is the abnormal traveling state.

9. A traveling state estimation method used in an onboard device, the traveling state estimation method comprising:
a voice collection step of collecting a voice produced by a driver;
a traveling state collection step of collecting traveling state information representing a traveling state of a vehicle;
a database generation step of generating a database by associating voice information corresponding to the collected voice with the collected traveling state information;
a learning step of learning an estimation model, with pairs including the voice information and the traveling state information recorded in the generated database being used as learning data;
a generating step of generating the estimation model through supervised learning, with the voice information of the learning data being used as an input vector and the traveling state information of the learning data being used as a training label; and
an estimation step of estimating the traveling state of the vehicle that may be influenced by a psychological state of the driver by using the estimation model, based on an utterance of the driver.

10. A traveling state estimation system comprising an onboard device and a server device connected via a communication network, wherein
the onboard device includes
a first memory; and
a first processor coupled to the first memory and configured to:
collect a voice produced by a driver,
collect traveling state information representing a traveling state of a vehicle, and
transmit voice information corresponding to the collected voice and the traveling state information to the server device,
the server device includes
a second memory; and
a second processor coupled to the second memory and configured to:
receive the voice information and the traveling state information transmitted from the onboard device,
generate a database by associating the received voice information with the traveling state information, and
learn an estimation model, with pairs including the voice information and the traveling state information recorded in the generated database being used as learning data,
generate the estimation model through supervised learning, with the voice information of the learning data being used as an input vector and the traveling state information of the learning data being used as a training label, and
wherein the any one of the first processor and the second processor is
configured to estimate the traveling state of the vehicle that may be influenced by a psychological state of the driver by using the estimation model, based on an utterance of the driver.

11. A traveling state estimation method for a traveling state estimation system including an onboard device and a server device connected via a communication network, the traveling state estimation method comprising:
a collection step of using the onboard device to collect a voice produced by a driver and collect traveling state information representing a traveling state of a vehicle;
a transmission step of using the onboard device to transmit voice information corresponding to the collected voice and the traveling state information to the server device;
a reception step of using the server device to receive the voice information and the traveling state information transmitted from the onboard device;
a database generation step of using the server device to generate a database by associating the received voice information with the traveling state information;
a learning step of using the server device to learn an estimation model, with pairs including the voice information and the traveling state information recorded in the generated database being used as learning data;
a generating step of generating the estimation model through supervised learning, with the voice information of the learning data being used as an input vector and the traveling state information of the learning data being used as a training label; and
an estimation step of using the onboard device or the server device to estimate the traveling state of the vehicle that may be influenced by a psychological state of the driver by using the estimation model, based on an utterance of the driver collected in the onboard device.

12. An onboard device constituting a traveling state estimation system together with a server device, the server device receiving voice information corresponding to a voice of a driver and traveling state information of a vehicle transmitted from the onboard device, generating a database recording the received voice information and the traveling state information in association with each other, learning an estimation model with a pair including the voice information and the traveling state information recorded in the generated database being used as learning data, and generating the estimation model through supervised learning, with the voice information of the learning data being used as an input vector and the traveling state information of the learning data being used as a training label, the onboard device comprising:
- a memory; and
- a processor coupled to the memory and configured to:
- collect the voice produced by the driver;
- collect the traveling state information representing a traveling state of the vehicle;
- transmit the voice information corresponding to the collected voice and the traveling state information to the server device; and
- estimate the traveling state of the vehicle that may be influenced by a psychological state of the driver by using the estimation model learned in the server device, based on an utterance of the driver.

13. A traveling state estimation method for an onboard device constituting a traveling state estimation system together with a server device, the server device receiving voice information corresponding to a voice of a driver and traveling state information of a vehicle transmitted from the onboard device, generating a database recording the received voice information and the traveling state information in association with each other, learning an estimation model with a pair including the voice information and the traveling state information recorded in the generated database being used as learning data, and generating the estimation model through supervised learning, with the voice information of the learning data being used as an input vector and the traveling state information of the learning data being used as a training label, the traveling state estimation method comprising:
- a voice collection step of collecting the voice produced by the driver;
- a traveling state collection step of collecting the traveling state information representing a traveling state of the vehicle;
- a transmission step of transmitting the voice information corresponding to the collected voice and the traveling state information to the server device; and
- an estimation step of estimating the traveling state of the vehicle that may be influenced by a psychological state of the driver by using the estimation model learned in the server device, based on an utterance of the driver.

14. A server device constituting a traveling state estimation system together with an onboard device, the onboard device collecting a voice produced by a driver, collecting traveling state information representing a traveling state of a vehicle, and transmitting voice information corresponding to the collected voice and the traveling state information, the server device comprising:
- a memory; and
- a processor coupled to the memory and configured to:
- receive the voice information and the traveling state information transmitted from the onboard device;
- generate a database by associating the received voice information with the traveling state information;
- learn an estimation model, with pairs including the voice information and the traveling state information recorded in the generated database being used as learning data; and
- generate the estimation model through supervised learning, with the voice information of the learning data being used as an input vector and the traveling state information of the learning data being used as a training label.

15. The server device according to claim 14, wherein the processor is configured to
- estimate the traveling state of the vehicle that may be influenced by a psychological state of the driver by using the estimation model, based on an utterance of the driver.

16. An information processing method for a server device constituting a traveling state estimation system together with an onboard device, the onboard device collecting a voice produced by a driver, collecting traveling state information representing a traveling state of a vehicle, and transmitting voice information corresponding to the collected voice and the traveling state information, the information processing method comprising:
- a reception step of receiving the voice information and the traveling state information transmitted from the onboard device;
- a database generation step of generating a database by associating the received voice information with the traveling state information;
- a learning step of learning an estimation model, with pairs including the voice information and the traveling state information recorded in the generated database being used as learning data; and
- a generating step of generating the estimation model through supervised learning, with the voice information of the learning data being used as an input vector and the traveling state information of the learning data being used as a training label.

* * * * *